(Model.)
2 Sheets—Sheet 1.
D. T. BURDEN.
Machine for Filing Gin Saws
No. 232,679.
Patented Sept. 28, 1880.
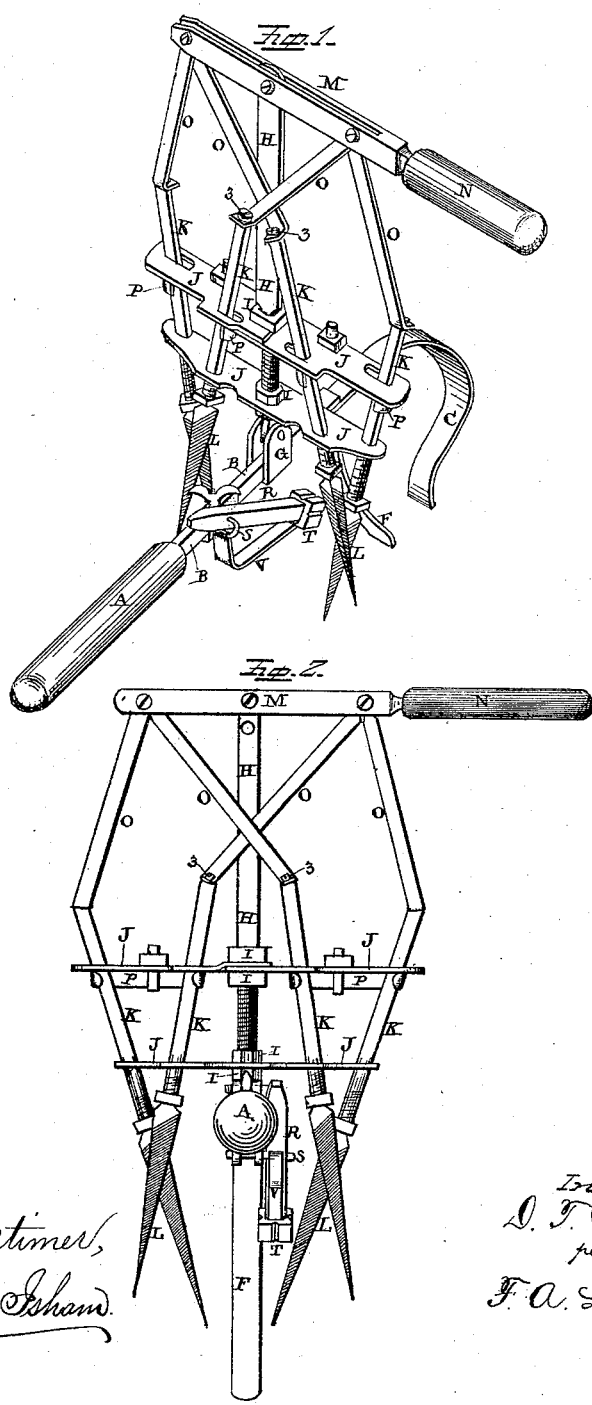

(Model.)
D. T. BURDEN.
Machine for Filing Gin Saws
2 Sheets—Sheet 2.
No. 232,679. Patented Sept. 28, 1880.
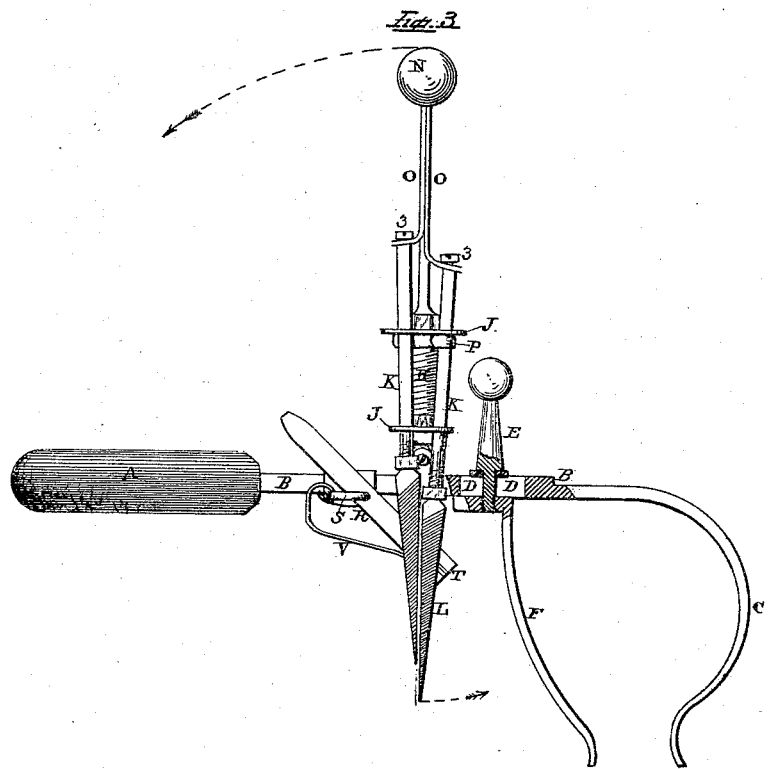
Witnesses:
W. W. Mortimer
Charles H. Isham
Inventor:
D. T. Burden,
per
F. A. Lehmann, Atty.

UNITED STATES PATENT OFFICE.

DAVID T. BURDEN, OF CARROLLTON, GEORGIA.

MACHINE FOR FILING GIN-SAWS.

SPECIFICATION forming part of Letters Patent No. 232,679, dated September 28, 1880.

Application filed June 29, 1880. (Model.)

*To all whom it may concern:*

Be it known that I, DAVID T. BURDEN, of Carrollton, in the county of Carroll and State of Georgia, have invented certain new and useful Improvements in Machines for Filing Gin-Saws; and I do hereby declare the following to be a full, clear, and exact description of the invention, such as will enable others skilled in the art to which it pertains to make and use it, reference being had to the accompanying drawings, which form part of this specification.

My invention relates to an improvement in machines for filing gin-saws; and it consists, first, in a shank having a hook formed on one end and an adjustable hook applied to this shank for catching over the cylinder to which the saws are secured, whereby the machine is held in place while the saw is being sharpened; second, in the arrangement and combination of parts, whereby four files are operated by the same operating-lever and the files held at a proper angle by means of the springs which catch around their rods, as will be more fully described hereinafter.

The object of my invention is to provide a hand-machine which can be used for sharpening gin-saws without taking them from their cylinders, and which will not only file them, but can be used for forming and sharpening the points of the teeth also.

Figure 1 is a perspective view of my invention. Fig. 2 is an end view of the same. Fig. 3 is a side view. Fig. 4 is a detail view of the spring which holds the file-rods at the same angle. Fig. 5 is an end view of the die.

A represents a wooden handle, which is to be held in the left hand while the machine is at work, and which is attached to the outer end of the shank B. This shank consists of a suitable rod of any desired length, and which has its other end formed into a hook, C, as shown, so as to catch over the top of the cylinder, to which the gin-saws are secured. This shank B has the slot D formed in it at any suitable point, and attached to the under side of this shank by means of the set-screw E, which passes down through the slot, is the adjustable hook F. This hook F catches over the opposite side of the cylinder from the hook C, and is made adjustable back and forth, so that the machine can be applied to cylinders of different sizes.

Secured to the shank B is a clip, G, which has pivoted between its upper ends the lower end of the standard H, which standard supports the file-operating mechanism for sharpening the saws upon both sides at once. This standard can be oscillated upon its pivot, so as to adjust the files at any inclination that may be preferred. The lower portion of this standard is provided with a screw-thread, and upon this threaded end are placed suitable clamping-nuts, I, between which the plates J are secured. These plates have holes or slots through them, and serve as guides for the rods K, which play back and forth through them, and have the files L secured to their lower ends. Pivoted upon the upper end of this standard is a double operating-lever, M, which is provided with a wooden handle, N, at one end, and which is to be operated by the right hand, while the other handle, A, is held in the left. Pivoted to this lever at suitable distances on each side of its pivot are the flat connecting-rods O, which rods have the file-rods attached to their lower ends. These file-rods pass through the guide-plates at such angles that the files cross each other at their lower ends, as shown, so as to straddle over the tops of the gin-saws, and thus file them alternately upon each side.

Through the upper guide-plate are made suitable slots for the file-rods to pass through. Each pair of file-rods is provided with a spring, P, for holding these rods at the same relative angle. These springs allow the rods to adjust themselves when any pressure is brought upon the files, and thus the files adjust themselves to various thicknesses of saws. Were it not for the springs each guide-plate would have simply holes through it to allow the files to pass through, and these files would then be rigidly held at the same angle, and thus only be adapted to saws of a single thickness.

The lower ends of the rods O are turned at right angles, and passed through these bent ends into the tops of the file-rods K are the screws 3. These screws are not screwed up tightly enough to form a rigid joint, but are only screwed partially in, so that the file-rods, by any suitable means, may be made to partially turn or twist, and thus file the teeth nearly round.

Adjustably secured to the shank B next to the handle A is the die R, by means of which the saw-teeth are sharpened and the saw fed forward tooth by tooth. This die consists of a steel block and a square shank, which has two holes made through it at right angles, so that the suitable pivot S, upon which it turns, can be withdrawn and the die turned around so as to present the other side. This shank is made of steel and has the steel block T shrunk upon its lower end. In each of the sides of the lower end of the shank is made a tapered triangular groove, and in the inner side of the block, which is shrunk upon this end, are made corresponding grooves. When this block and the die are secured together these grooves form four-sided conical recesses, in which the ends of the teeth of the saw are caught, and then by striking the outer end of the shank of the die gently with a hammer the points of the teeth, after having been filed, are sharpened and given a uniform shape.

Attached to the leg of the staple which forms the pivot for the shank is a spring, V, the lower end of which catches against the lower end of the shank and keeps it always pressed forward, but at the same time allows it to give as the machine is moved backward and downward by depressing the handle A, so as to cause the die to catch against another tooth. This die has a recess, X, in its lower end, and extends forward toward the saws, so that this recess will catch over the teeth on the saw, and as the handle A is moved upward with the left hand when the files have sharpened one tooth sufficiently, this die causes the cylinder to be advanced far enough to present new teeth to the files. In this manner the die serves not only to feed the saw forward, but to sharpen the points of the teeth after they have been filed.

This machine is attached to the cylinder of the cotton-gin to which the saws are secured by means of the two hooks, the movable block having been moved upward sufficiently close against the side of the cylinder to prevent any endwise movement of the machine. While the machine is supported in the left hand by means of the handle A, the files which straddle over the tops of the saws are operated by means of the other handle, which extends outward at right angles to the handle A, and is held in the right hand. As soon as the teeth upon which the files are operating are sufficiently filed the machine is turned backward on the cylinder by depressing the handle A to any desired extent, and an upward movement is then made upon the handle A, which causes the die, which has caught against the teeth of a third saw, which is between the two saws being operated upon, to move, and this movement causes the cylinder to turn around far enough to present new teeth to the files. After the teeth have been filed the end of each tooth is made to catch in one of the small square openings in the end of the die, and the shank of the die is then given a slight blow with a hammer, which causes the teeth to have a uniform finish in shape and sharpness.

Having thus described my invention, I claim—

1. The shank B, provided with a handle, A, at one end, and a hook, C, at the other, in combination with an adjustable hook that is attached to the shank, whereby the machine can be applied to the cylinder to which the saws are secured, substantially as shown.

2. The combination of the shank B, having the hook C at one end and the handle A at the other, with the hook F, clip G, standard H, guides J, lever M, and rods O K, whereby the machine can be attached to the saw-cylinder and the files inclined at any desired angle, substantially as described.

3. The combination of a shank for supporting and attaching the file-operating mechanism to the saw-cylinder, and having the clip rigidly secured to it, with the vertical standard H, pivoted at its lower end, the guides J, lever M, and rods O K, substantially as set forth.

4. In a saw-filing machine, the combination of the shank B, which supports the machine, with the die R, pivoted to it, and having the spring V, to keep its inner end pressed forward, whereby the die is made to turn the saw-cylinder when the outer end of the shank is raised, substantially as described.

In testimony that I claim the foregoing I have hereunto set my hand this 27th day of June, 1880.

DAVID T. BURDEN.

Witnesses:
D. B. JUHAN,
G. D. MERRELL.